United States Patent [19]
Krivec et al.

[11] Patent Number: 5,746,298
[45] Date of Patent: May 5, 1998

[54] ADJUSTABLE TORQUE-LIMITING MINI SCREWDRIVER

[75] Inventors: Bert Krivec, Brookfield, Wis.; Thomas B. Petruzzi, Rockaway; John A. Braun, Kenilworth, both of N.J.

[73] Assignee: Snap-on Technologies, Inc., Lincolnshire, Ill.

[21] Appl. No.: 684,242

[22] Filed: Jul. 19, 1996

[51] Int. Cl.⁶ .................. F16D 47/02; F16D 7/02; B25B 23/142; B25B 23/157
[52] U.S. Cl. .......... 192/48.3; 81/475; 192/48.92; 192/55.1; 192/56.1; 192/56.61; 464/41
[58] Field of Search ............... 192/48.3, 56.61, 192/55.1, 56.1, 48.6, 48.92; 464/38, 41; 81/473, 474, 475, 476

[56] References Cited

U.S. PATENT DOCUMENTS

| | | | |
|---|---|---|---|
| 360,563 | 4/1887 | Conover et al. | 81/475 |
| 689,722 | 12/1901 | Hoover. | |
| 2,396,040 | 3/1946 | Darling. | |
| 2,410,971 | 11/1946 | Hartley. | |
| 2,558,158 | 6/1951 | Rock. | |
| 2,771,804 | 11/1956 | Better et al. | |
| 2,773,370 | 12/1956 | Intraub et al. | |
| 2,797,564 | 7/1957 | Bonneau et al. | 464/38 |
| 2,820,381 | 1/1958 | White. | |
| 2,884,103 | 4/1959 | Connell. | |
| 3,956,905 | 5/1976 | Thackston. | |
| 4,062,203 | 12/1977 | Leonard et al. | 464/38 |
| 4,341,292 | 7/1982 | Acevedo | 192/48.92 X |
| 4,572,041 | 2/1986 | Rissmann. | |
| 4,687,082 | 8/1987 | Lenfeldt. | |
| 4,721,169 | 1/1988 | Nagasawa et al. | |
| 4,844,177 | 7/1989 | Robinson et al. | |
| 4,848,547 | 7/1989 | Kampf | 192/48.92 X |
| 4,883,130 | 11/1989 | Dixon. | |
| 5,156,244 | 10/1992 | Pyles et al. | |
| 5,201,374 | 4/1993 | Rahm. | |
| 5,346,022 | 9/1994 | Krivec. | |
| 5,356,350 | 10/1994 | Schreiber. | |
| 5,458,206 | 10/1995 | Bourner et al. | |

*Primary Examiner*—Rodney H. Bonck
*Attorney, Agent, or Firm*—Emrich & Dithmar

[57] ABSTRACT

A miniature, adjustable torque limiting screwdriver includes an elongated hollow handle internally threaded at one end. A torque-limiting mechanism is disposed within the handle and includes a rigid shaft having a hex inner end and a plurality of flexible resilient fingers engageable with the hex. An adjusting collar encircles and engages the fingers and is threadedly engaged with the handle for axial movement to adjust the force with which the fingers grip the hex end of the shaft. The outer end of the shaft sockets a driver shank. When the handle is rotated it rotates the shank up to a predetermined torque, at which point the flexible and resilient torque members slip with respect to the drive surface portions of the shaft to prevent further torque application. The outer end of the shaft carries a gear member engaged by a spring-biased pin socketed in the handle, the gear teeth being arranged to accommodate a ratcheting rotation in one direction to permit relative rotation of the handle with respect to the shaft in one direction but to prevent relative rotation in the opposite direction.

20 Claims, 2 Drawing Sheets

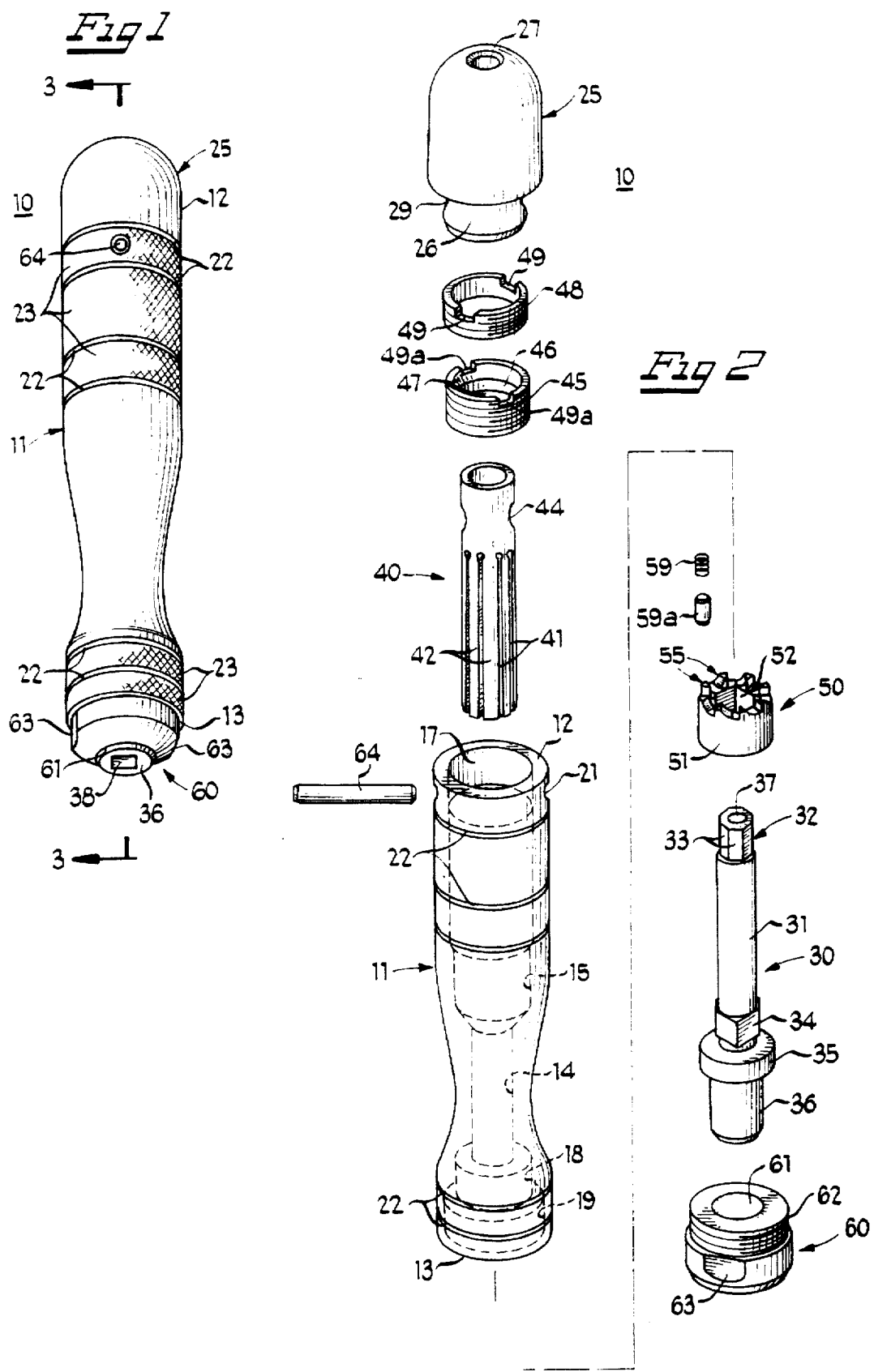

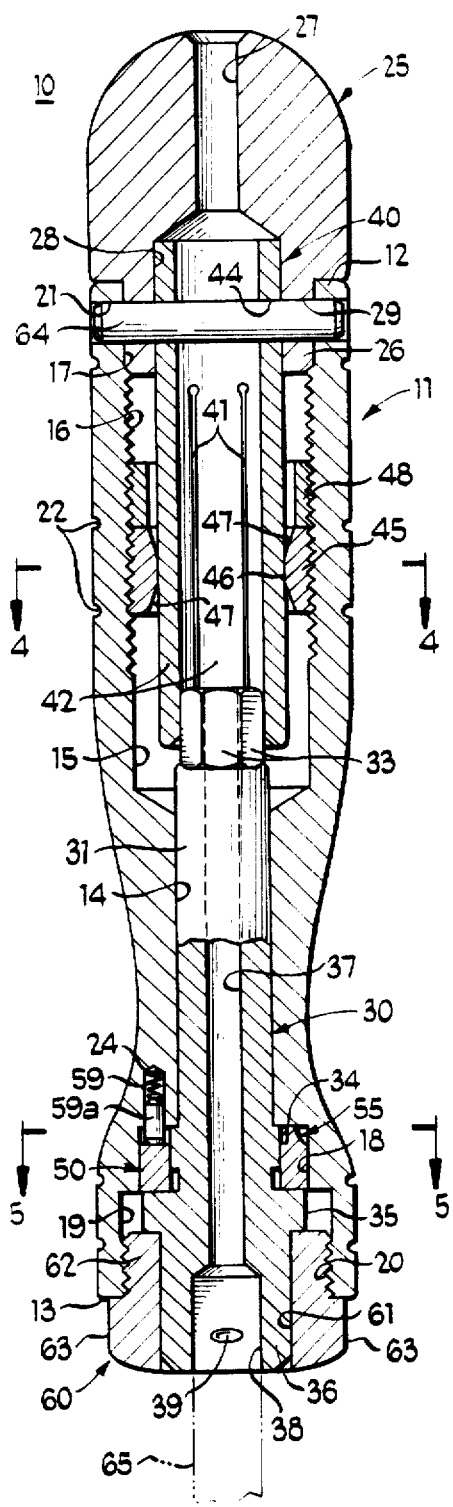
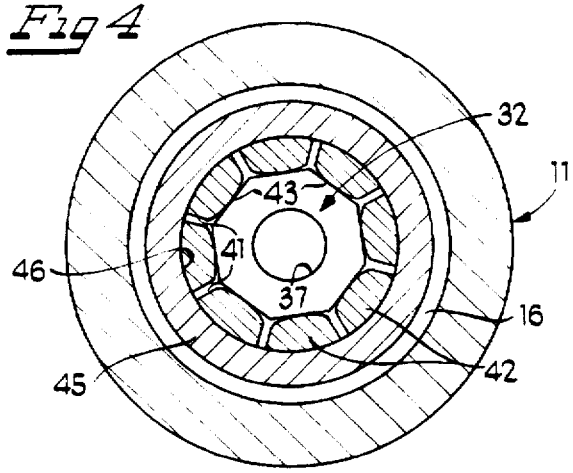
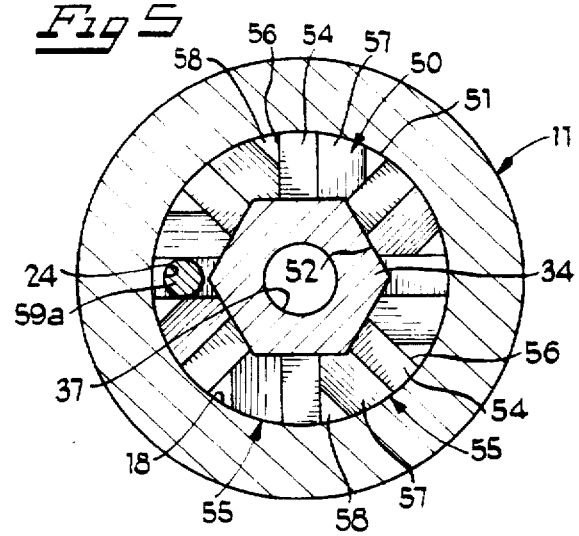
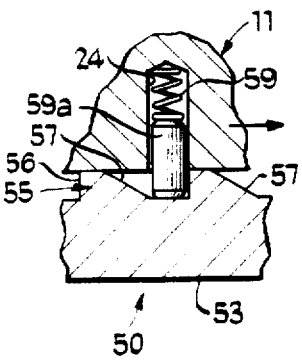
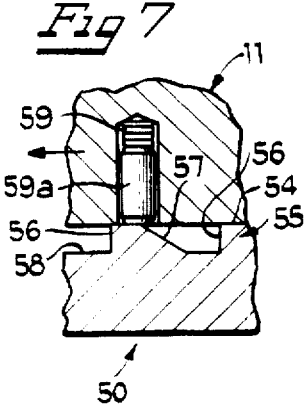

ADJUSTABLE TORQUE-LIMITING MINI SCREWDRIVER

BACKGROUND OF THE INVENTION

1. Field of the Invention

The present invention relates generally to torque-limiting drivers and, more particularly, to such drivers wherein the torque limit is adjustable.

2. Description of the Prior Art

Known torque limiting drivers have an input member and an output member coupled with each other by a mechanism for limiting the torque transmitted therebetween. In one type of torque limiting mechanism, one of the members is a rigid member having outer drive surface portions and the other member includes a plurality of flexible and resilient arms or fingers which resiliently engage the drive surfaces on the rigid member with a force which is adjustable by a retainer. The retainer holds the resilient arms or fingers against the drive surfaces with a predetermined force, which is variable by moving the retainer axially along the resilient arms or fingers. One such adjustable torque-limiting mechanism is disclosed in U.S. Pat. No. 5,346,022. That mechanism is designed for use in an air impact tool and the mechanism for axially moving the retainer is a complicated, multi-part mechanism which is expensive to manufacture and assemble and which is not conducive to use in a manual driver, particularly a miniature screwdriver.

Furthermore, the above-described torque-limiting mechanism is operable only in a torque-limiting mode. While the torque-limiting mode is desirable for applying or tightening a fastener, in other circumstances it is useful to operate without a torque limit. This is particularly true, for example, when attempting to remove or loosen a stuck fastener, which can require the application of an initial torque which may be much greater than the limited torque used in applying the fastener.

It is known to incorporate a unidirectional feature in a torque-limiting mechanism, so that the mechanism is torque limiting only when operated in one direction, and when rotated in the other direction operates in a standard, non-torque-limiting mode. One such arrangement is disclosed in U.S. Pat. No. 4,572,041, wherein the drive surfaces on the rigid torque member are tooth-like surfaces, sloped on one flank to accommodate a camming movement of the resilient fingers along and past the surfaces when rotated in one direction, and shaped at the other end to stop or catch the resilient torque fingers, so as to prevent relative rotation in the opposite direction. However, that mechanism is not provided with a handle and must be used together with a standard wrench or other lever device. Additionally, the construction of the device is such that, in assembly, the parts must be bonded together by suitable means, such as welding, brazing, adhesives, or the like.

SUMMARY OF THE INVENTION

It is a general object of the invention to provide an improved adjustable torque-limiting apparatus which avoids the disadvantages of prior devices while affording additional structural and operating advantages.

An important feature of the invention is the provision of an adjustable torque-limiting apparatus of the type set forth, which is adapted for use in a miniature driver device, such as a screwdriver.

A further feature of the invention is the provision of an apparatus of the type set forth, which is of relatively simple and economical construction.

In connection with the foregoing features, a further feature of the invention is the provision of an apparatus of the type set forth which is operable in a dual mode, being torque-limiting in one direction and non-torque-limiting in the opposite direction.

Another feature of the invention is the provision of an apparatus of the type set forth which can be assembled without the use of any bonding techniques.

Yet another feature of the invention is the provision of a manual driver apparatus incorporating the torquing apparatus of the type set forth.

Certain ones of the these and other features of the invention are attained by providing a dual-mode torquing apparatus operable in a torque-limiting mode in a first direction and a non-torque-limiting mode in a second direction, the apparatus comprising: first and second rotatable structures; a torque-limiting mechanism coupled between the structures and responsive to rotation of the first structure to rotate the second structure at torques below a predetermined torque and accommodating rotation of the first structure relative to the second structure at the predetermined torque and above; and lock mechanism coupled between the structures and accommodating rotation of the first structure relative to the second structure in the first direction and preventing relative rotation of the structures when the first structure is rotated in the second direction.

Further features are attained by providing a manual torque limiting driver apparatus comprising: first and second rotatable torque structures, the first torque structure including a rigid torque member having a peripheral drive surface including a plurality of drive surface portions, the second torque structure having an axis of rotation and including a handle and a plurality of flexible and resilient torque members carried by the handle and spaced radially from the axis and engageable with the peripheral drive surface, the handle having an internally threaded cylindrical portion; and a retainer disposed entirely radially outwardly of the entirety of the resilient torque members and disposed in engagement therewith for holding the resilient torque members in engagement with the peripheral drive surface with a predetermined force for preventing rotation of the resilient torque members and the rigid torque member relative to each other at torques below a predetermined torque, the resilient torque members being yieldable at the predetermined torque and above to accommodate relative rotation between the resilient torque members and the rigid torque member, the retainer being disposed within the handle and threadedly engaged with the internally threaded portion for cooperation therewith so that rotation of the retainer relative to the handle effects axial movement of the retainer relative to the resilient torque members for varying the predetermined force to vary the torque at which the resilient torque members will yield.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

3

FIG. 1 is a perspective view of a dual-mode torquing apparatus in accordance with the present invention;

FIG. 2 is an exploded, perspective view of the torquing apparatus of FIG. 1;

FIG. 3 is an enlarged view in vertical section taken generally along the line 3—3 in FIG. 1;

FIG. 4 is a further enlarged sectional view taken along the line 4—4 in FIG. 3;

FIG. 5 is a further enlarged sectional view taken along the line 5—5 in FIG. 3;

FIG. 6 is a further enlarged, fragmentary, sectional view of the locking mechanism of the apparatus of FIG. 3 when operated in a non-torque-limiting mode; and FIG. 7 is a view similar to FIG. 6, illustrating operation in a torque-limiting mode.

DESCRIPTION OF THE PREFERRED EMBODIMENT

Referring to FIGS. 1–3, there is illustrated a dual-mode torquing apparatus 10 in accordance with the present invention, the apparatus 10 being in the form of an adjustable, torque-limiting, miniature driver for a shank, such as that of a screwdriver, nut driver or the like. The apparatus 10 has an elongated, hollow, cylindrical handle 11 which defines a first rotating structure and has a butt end 12 and a working end 13. Formed longitudinally through the handle 11 is an axial bore 14 provided adjacent to the butt end 12 with a counterbore 15 which has an internally-threaded portion 16 (FIG. 3). A further counterbore 17 is provided at the rear end of the threaded portion 16. Formed adjacent to the working end of the handle 11 is a counterbore 18, which is, in turn, provided with a further counterbore 19 which has an internal thread 20 (FIG. 3). A bore 21 is formed diametrically through the handle 11 adjacent to the butt end 12 thereof and communicates with the counterbore 17. Formed on the cylindrical outer surface of the handle 11 are a plurality of longitudinally spaced-apart circumferential grooves 22, the surface portions between these grooves preferably being knurled, as at 23, for improved grip. Formed in the inner end surface of the counterbore 18 is a spring bore 24 which extends parallel to the axis of the handle 11 (see FIGS. 3, 6 and 7) for a purpose to be explained more fully below.

The apparatus 10 also includes an end cap 25 having a reduced-diameter, cylindrical end 26 dimensioned to fit telescopically within the counterbore 17 in the handle 11. The cap 25 has an axial bore 27 formed therethrough provided with a counterbore 28 in the reduced end 26 (FIG. 3). Formed diametrically through the reduced end 26 is a bore 29 which communicates with the counterbore 28.

Referring now also to FIGS. 4 and 5, the apparatus 10 also includes an elongated reaction post 30, which forms a second rotatable structure. The post 30 is preferably unitarily formed of a suitable metal and has a main circularly cylindrical body 31 provided at its inner end with an octagonal drive surface portion 32 having eight substantially flat, planar, drive surfaces 33. The post 30 is provided at the other end of the main body 31 with a hexagonal portion 34. A radially outwardly extending annular flange 35 is formed on the post 30 a slight distance axially forwardly from the hexagonal portion 34. The post 30 has an enlarged-diameter forward end 36 which has a diameter intermediate the diameters of the main body 31 and the flange 35. An axial bore 37 is formed longitudinally through the post 30. Formed in the enlarged-diameter end 36 is a square socket

4

38 having one or more detent recesses 39 formed in the flat side surfaces thereof (FIG. 3). The reaction post 30 is dimensioned and arranged to be received in the forward end of the handle 11, as will be explained more fully below.

The apparatus 10 also includes a torque limiting member 40 which is in the nature of an elongated, hollow, tubular member having seven equiangularly spaced-apart radial slots 41 formed in the forward end thereof, each of the slots 41 extending longitudinally about two-thirds of the length of the member 40, and cooperating to form eight flexible, resilient, elongated fingers 42, each of which has a convex inner bearing surface 43 (see FIG. 4). Formed diametrically through the member 40 rearwardly of the fingers 42 is a bore 44. In use, the torque limiting member 40 is received in the rear end of the handle 11, with the distal ends of the fingers 42 fitted over the drive surface portion 32 of the reaction post 30, as will be explained more fully below.

The torque limiting member 40 forms part of a torque limiting mechanism, which includes an annular, externally threaded adjusting collar 45 threadedly engageable with the threaded portion 16 of the handle 11. The collar 45 is dimensioned to fit around the fingers 42 and is provided with an inner cylindrical bearing surface 46 which bears against the outer surface of the fingers 42 (see FIGS. 3 and 4). The collar 45 also has frustoconical surfaces 47 at the forward and rearward ends of the bearing surface 46 to facilitate fitting of the torque limiting member 40 therethrough. The mechanism also includes an externally threaded jam nut 48 adapted for threaded engagement with the threaded portion 16 of the handle 11 and having an inner diameter greater than the outer diameter of the torque limiting member 40. Preferably, the jam nut 48 is provided at one end thereof with a diametrically extending slot 49 for receiving a suitable drive tool, such as a screwdriver blade or the like (see FIG. 2). In like manner, a similar slot 49a is formed in the rear end of the adjusting collar 45.

Referring now also to FIGS. 6 and 7, the apparatus 10 also has a lock mechanism including a lock gear 50, which has a cylindrical outer surface 51 and a hexagonal inner surface 52, the gear 50 extending axially between annular outer and inner end faces 53 and 54. Formed in the inner end face 54 are a plurality of circumferentially spaced-apart teeth 55. Each tooth 55 has a radial face 56 extending perpendicular to the inner end face 54 and substantially parallel to the axis of the lock gear 50, and an inclined ramp face 57, which intersects the inner end face 54 at an obtuse angle a predetermined distance from the face 56 so that the tooth has a flat crest in the plane of the inner end face 54. The teeth 55 are spaced apart by recessed spacing surfaces 58 which are parallel to the inner end face 54, with each surface 58 extending from the radial face 56 of one tooth to the ramp face 57 of the adjacent tooth. The locking mechanism also includes a helical compression spring 59 which is seated in the spring bore 24 and a pawl pin 59a which is also received in the bore 24 and is resiliently urged by the spring 59 against the toothed face of the lock gear 50.

The apparatus 10 also includes a cylindrical front cap 60 having an axial bore 61 formed therethrough. The outer surface of the cap 60 has a reduced-diameter, externally threaded inner end portion 62 adapted for threaded engagement with the thread 20 on the handle 11. Diametrically opposed flats 63 may be formed in the outer surface of the cap 60 to facilitate engagement by a wrench or other suitable tool.

In assembly, the lock gear 50 is first fitted over the main body 31 of the reaction post 30, until the outer end face 53 abuts the flange 35. In this regard, it will be appreciated that the hexagonal inner surface 52 of the lock gear 50 is dimensioned for mating engagement with the hexagonal portion 34 of the reaction post 30. The reaction post 30 is then inserted in the working end of the handle 11, the main body 31 being dimensioned to be slidably received in the axial bore 14 to a mounting position, illustrated in FIG. 3, wherein the hexagonal portion 34 abuts the annular inner end wall of the counterbore 18, at which point the octagonal drive surface portion 32 is disposed in the counterbore 15. It will be appreciated that the lock gear 50 has an axial extent such that it would be accommodated in the counterbore 18 of the handle 11. The handle 11 and the reaction post 30 are rotated relative to each other so that the pin 59a of the locking mechanism seats against one of the spacing surfaces 58 of the lock gear 50 between adjacent teeth 55 thereof, in the position illustrated in FIG. 6. The front cap 60 is then threadedly engaged with the thread 20 at the working end 13 of the handle 11 until it seats against the flange 35, thereby retaining the reaction post 30 and the lock mechanism in place in the handle 11.

The adjusting collar 45 is then threaded into the threaded portion 16 of the handle 11 to a predetermined axial location, and the jam nut 48 is then threaded into place to lock the adjusting collar 45 in position. It will be appreciated that the threading of the adjusting collar 45 and the jam nut 48 into the handle 11 is effected with the aid of a suitable bladed tool, such as a flat-bladed screwdriver or the like, which is received in the slots 49 or 49a to rotate the parts in a known manner. The torque limiting member 40 is then received in the butt end of the handle 11, with the fingers 42 being fitted through the jam nut 48 and the adjusting collar 45, insertion into the locking collar 45 being facilitated by the rearward one of the frustoconical surfaces 47. The distal ends of the fingers 42 are then fitted over the octagonal drive surfaces portion 32 of the reaction post 30. In this regard, the distal ends of the fingers 42 may be chamfered or beveled at their inner surfaces to facilitate guiding onto the reaction post 30. The torque limiting member 40 is inserted to a depth and rotated to a rotational position such that the diametral bore 44 therethrough is aligned with the bore 21 in the handle 11, with the inner bearing surfaces 43 of the fingers 42 respectively disposed in bearing engagement with the flat drive surfaces 33 of the reaction post 30, respectively substantially centrally thereof (see FIG. 4).

Finally, the end cap 25 is mounted in place, the reduced end 26 thereof being telescopically received in the counterbore 17 of the handle 11, with the rear end of the torque limiting member 40 being socketed in the counterbore 28 of the end cap 25. The end cap 25 is rotationally positioned so that the diametral bore 29 therethrough is aligned with the bores 21 and 44 in the handle 11 and the torque limiting member 40. Then, the pin 64 is received through the aligned bores to lock the parts together in their assembled condition.

Referring now in particular to FIGS. 3–7, the operation of the torquing apparatus 10 will be described. It is a fundamental aspect of the invention that the apparatus 10 is operable in two different modes, viz., a torque-limiting mode and a non-torque-limiting mode. It will be appreciated that the apparatus 10 is adapted for socketing a driver shank 65 (FIG. 3) in the square socket 38 of the reaction post 30 for driving an associated fastener or the like. When the handle 11 is gripped by a user and is rotated in the clockwise direction, as viewed from the butt end 12 thereof, it operates in a torque-limiting mode. Thus, rotation of the handle 11 will, via the coupling pin 64, rotate the torque limiting member 40 which, in turn, will rotate the reaction post 30 and the driver shank 65 socketed therein. Such operation of the apparatus 10 will continue in a normal manner until the torque applied to the associated fastener (not shown) reaches a predetermined level, at which point the distal ends of the fingers 42 will flex sufficiently to slip past the corners of the octagonal drive surface portion 32 of the reaction post 30, thereby limiting the torque which can be applied to the predetermined value.

This slipping rotation of the torque limiting member 40 relative to the reaction post 30 is accommodated by the lock mechanism. More specifically, referring to FIG. 7, as the handle 11 is rotated in the direction of the arrow in FIG. 7, the pawl pin 59a rides up the ramp face 57 of the gear tooth 55 and is retracted into the spring bore 24 against the urging of the spring 59 to allow the handle 11 to rotate relative to the lock gear 50 and, therefore, relative to the reaction post 30, since the lock gear 50 is non-rotationally fixed on the reaction post 30. Thus, it will be appreciated that the pin 59a ratchets past the teeth 55 of the lock gear 50 to accommodate this torque-limiting relative rotation of the parts.

However, when the apparatus 10 is rotated in the opposite or fastener-loosening direction, it is desirable that it not function in a torque-limiting mode. Thus, the apparatus 10 is designed so that, when the handle 11 is rotated in the counterclockwise direction, as viewed from the butt end 12 of the handle 11, the apparatus 10 functions in a non-torque-limiting mode. More specifically, referring to FIG. 6, as the handle 11 is rotated in the direction of the arrow in FIG. 6, when the limiting torque is reached the torque limiting member 40 cannot slip relative to the reaction post 30, since the pin 59a is locked against the radial face 56 of the gear tooth 55. Thus, the handle 11 will continue to rotate as a unit with the reaction post 30, irrespective of the torque level being applied.

It will be appreciated that the predetermined torque level can be adjusted by changing the axial position of the adjusting collar 45 along the torque limiting member 40. Thus, the closer the collar 45 is to the octagonal drive surface portion 32 of the reaction post 30, the greater the resistance to flexing of the fingers 42 and the higher the limiting torque value. Conversely, the farther the adjusting collar 45 is from the octagonal drive surface portion 32, the lower the limiting torque value. In order to effect this adjustment, the end cap 25 must be removed by first removing the pin 64. Then, the torque limiting member 40 is removed, the jam nut 48 is unthreaded from the handle 11 and the position of the adjusting collar 45 is adjusted with the use of a suitable bladed tool, as explained above. The parts are then reassembled after the adjustment has been made.

From the foregoing, it can be seen that there has been provided an improved dual-mode torquing apparatus which is operable in one direction in a torque-limiting mode and in an opposite direction in a non-torque-limiting mode, the apparatus being provided with a lock mechanism to control the operation in the two different modes. The apparatus is constructed in a manner which facilitates miniaturization of the parts, so that it can be conveniently embodied in a driving tool, such as a miniature screwdriver or the like, of the type which is suitable, for example, in prosthodontic applications. In a constructional model of the invention, the reaction post 30, the torque limiting member 40 and the lock gear 50 are preferably formed of a suitable metal, such as stainless steel, while the handle 11 and the caps 25 and 60 may be formed of a metal, such as aluminum or, alternatively, may be formed of a suitable plastic.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A dual-mode torquing apparatus operable in a torque-limiting mode in a first direction and a non-torque-limiting mode in a second direction, said apparatus comprising: first and second rotatable structures; a torque-limiting mechanism coupled between said structures and responsive to rotation of said first structure to rotate said second structure at torques below a predetermined torque and accommodating rotation of the first structure relative to the second structure at said predetermined torque and above; and lock mechanism coupled between said structures and accommodating rotation of said first structure relative to said second structure in the first direction and preventing relative rotation of the structures when said first structure is rotated in the second direction, said torque limiting mechanism and said lock mechanism respectively including portions movable respectively in mutually perpendicular directions.

2. The apparatus of claim 1, wherein said first and second structures are rotatable about a common axis.

3. The apparatus of claim 1, wherein said second structure is disposed within said first structure.

4. The apparatus of claim 1, wherein said torque-limiting mechanism is spaced from said lock mechanism.

5. The apparatus of claim 1, wherein said lock mechanism includes a first part on said first structure and a second part on said second structure.

6. The apparatus of claim 5, wherein said second part includes a gear member and said first part includes a pawl member and means resiliently biasing said pawl member into engagement with said gear member.

7. The apparatus of claim 1, wherein said first structure has an axis of rotation, said torque limiting mechanism including a rigid torque portion on said second structure having a plurality of drive surface portions, and a plurality of flexible and resilient torque members carried by the first structure and spaced radially from the axis and engageable with said drive surface portions, and a retainer disposed in engagement with said resilient torque members for holding them in engagement with said peripheral drive surface with a predetermined force.

8. A manual dual-mode torque drive apparatus operable in a torque-limiting mode in a first direction and a non-torque-limiting mode in a second direction, said apparatus comprising: first and second rotatable structures, said first structure including a handle and said second structure including a shank holder; a torque-limiting mechanism coupled between said structures and responsive to rotation of said handle to rotate said shank holder at torques below a predetermined torque and accommodating rotation of the handle relative to the shank holder at said predetermined torque and above; and lock mechanism coupled between said structures independently of said torque-limiting mechanism and accommodating rotation of said handle relative to said shank holder in the first direction and preventing relative rotation of the handle and the shank holder when said handle is rotated in the second direction.

9. The apparatus of claim 8, wherein said first and second structures have a common axis of rotation.

10. The apparatus of claim 8, wherein at least a portion of said second structure is disposed within said handle.

11. The apparatus of claim 8, wherein said shank holder includes an elongated shaft having inner and outer ends, said torque-limiting mechanism being coupled adjacent to the inner end of said shaft and said lock mechanism being coupled adjacent to the outer end of said shaft.

12. The apparatus of claim 8, wherein said first structure includes an end cap removably mounted on said handle.

13. The apparatus of claim 8, wherein said torque limiting mechanism includes a first part coupled to said handle and a second part on said shank holder.

14. The apparatus of claim 13, and further comprising means releasably coupling said first part to said handle.

15. A manual torque limiting driver apparatus comprising: first and second rotatable torque structures, the second torque structure including a rigid torque member having a peripheral drive surface including a plurality of drive surface portions, the first torque structure having an axis of rotation and including a handle and a plurality of flexible and resilient torque members carried by the handle and spaced radially from the axis and engageable with said peripheral drive surface, said handle having an internally threaded cylindrical portion unitary therewith; and a retainer disposed entirely radially outwardly of the entirety of said resilient torque members and disposed in engagement therewith for holding said resilient torque members in engagement with said peripheral drive surface with a predetermined force for preventing rotation of said resilient torque members and said rigid torque member relative to each other at torques below a predetermined torque, said resilient torque members being yieldable at said predetermined torque and above to accommodate relative rotation between said resilient torque members and said rigid torque member, said retainer being disposed within said handle and threadedly engaged with said internally threaded portion for cooperation therewith so that rotation of said retainer relative to said handle effects axial movement of said retainer relative to said resilient torque members for varying the predetermined force to vary the torque at which said resilient torque members will yield.

16. The apparatus of claim 15, and further comprising an end cap removably coupled to said handle for cooperation therewith to enclose said resilient torque members.

17. The apparatus of claim 16, and further comprising means releasably coupling said cap to each of said handle and said first torque structure for coupling said first torque structure to said handle.

18. The apparatus of claim 15, and further comprising lock mechanism coupled between said torque structures and accommodating rotation of said first torque structure relative to said second torque structure in a first direction and preventing relative rotation of the structures when said first torque structure is rotated in a second direction.

19. The apparatus of claim 18, wherein said rigid torque member has inner and outer ends, said drive surface portions being disposed adjacent to said inner end and said lock mechanism being disposed to said outer end.

20. The apparatus of claim 18, wherein said lock mechanism includes a gear member carried by said rigid torque member and a pin carried by said handle and resiliently urged into engagement with said gear member.

* * * * *